United States Patent
Miyasaka

(10) Patent No.: US 10,981,353 B2
(45) Date of Patent: Apr. 20, 2021

(54) ABSORBENT COMPOSITE

(71) Applicant: SEIKO EPSON CORPORATION, Tokyo (JP)

(72) Inventor: Yoichi Miyasaka, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/697,289

(22) Filed: Nov. 27, 2019

(65) Prior Publication Data

US 2020/0171788 A1    Jun. 4, 2020

(30) Foreign Application Priority Data

Nov. 29, 2018  (JP) .............................. JP2018-224031

(51) Int. Cl.
| | | |
|---|---|---|
| *B32B 5/26* | (2006.01) | |
| *B32B 27/12* | (2006.01) | |
| *B41J 2/165* | (2006.01) | |
| *B41J 2/17* | (2006.01) | |

(52) U.S. Cl.
CPC ................ *B32B 5/26* (2013.01); *B32B 27/12* (2013.01); *B41J 2/16523* (2013.01); *B41J 2/1721* (2013.01)

(58) Field of Classification Search
CPC . B41J 2/1721; B32B 3/14; B32B 3/18; B32B 5/26; B32B 27/14; B32B 27/12
See application file for complete search history.

(56) References Cited

U.S. PATENT DOCUMENTS

2018/0289234 A1* 10/2018 Policicchio ............... B32B 5/26
2018/0296403 A1   10/2018 Kobayashi et al.
2018/0312362 A1   11/2018 Muhamad Nor Salehuddin et al.

FOREIGN PATENT DOCUMENTS

| CN | 107723923 A | 2/2018 |
|---|---|---|
| CN | 108024885 A | 5/2018 |
| JP | H04-090851 A | 3/1992 |

* cited by examiner

*Primary Examiner* — Julian D Huffman
(74) *Attorney, Agent, or Firm* — Oliff PLC

(57) ABSTRACT

An absorbent composite of the present disclosure includes an aggregate of small pieces having a shape with a longitudinal direction, including fibers and a water absorbent resin, in which when a total length in the longitudinal direction of the small piece is L1 [mm] and a distance between end points connecting one end and the other end of the small piece is L2 [mm], an average value of L2/L1 is greater than 0 and 0.950 or less.

6 Claims, 8 Drawing Sheets

ABSORBENT COMPOSITE

The present application is based on, and claims priority from JP Application Serial Number 2018-224031, filed Nov. 29, 2018, the disclosure of which is hereby incorporated by reference herein in its entirety.

BACKGROUND

1. Technical Field

The present disclosure relates to an absorbent composite.

2. Related Art

In the ink jet printer, waste ink is generated during a head cleaning operation normally performed to prevent a decrease in print quality due to clogging of the ink, or an ink filling operation after replacing an ink cartridge. Therefore, in order to prevent such waste ink from being attached unintentionally to a mechanism or the like inside the printer, a liquid absorber that absorbs the waste ink is provided.

In the related art, as a liquid absorber, a liquid-absorbent block containing hydrophilic fibers and a superabsorbent polymer is used (for example, refer to JP-A-4-90851).

However, the above liquid absorber is formed in a block shape as a whole, does not follow a container, and it is difficult to control the amount and density of the liquid absorber in the container.

Furthermore, in the above liquid absorber, although the density was increased in order to maximize an effect of capillary phenomenon and increase the amount of water retention, there was a problem that a permeation rate at an upper surface of an absorber is reduced, and a pigment and the like of an ink component is coated and accumulated to inhibit the permeation to an end of the container. Although an effect of accumulation of the ink component was reduced by hollowing a portion of the absorber to provide an accumulation space, the amount of absorption decreases by the amount of hollowing, and as a result, there was a problem that the container size had to be increased.

SUMMARY

The present disclosure can be realized in the following application examples.

According to an aspect of an application example of the present disclosure, there is provided with an absorbent composite including an aggregate of small pieces having a shape with a longitudinal direction, including fibers and a water absorbent resin, in which when a total length in the longitudinal direction of the small piece is L1 [mm] and a distance between end points connecting one end and the other end of the small piece is L2 [mm], an average value of L2/L1 is greater than 0 and 0.950 or less.

DESCRIPTION OF EXEMPLARY EMBODIMENTS

Hereinafter, preferred embodiments of the present disclosure will be described in detail.

Absorbent Composite

Hereinafter, an absorbent composite of the present disclosure will be described.

First Embodiment

Figure 1:
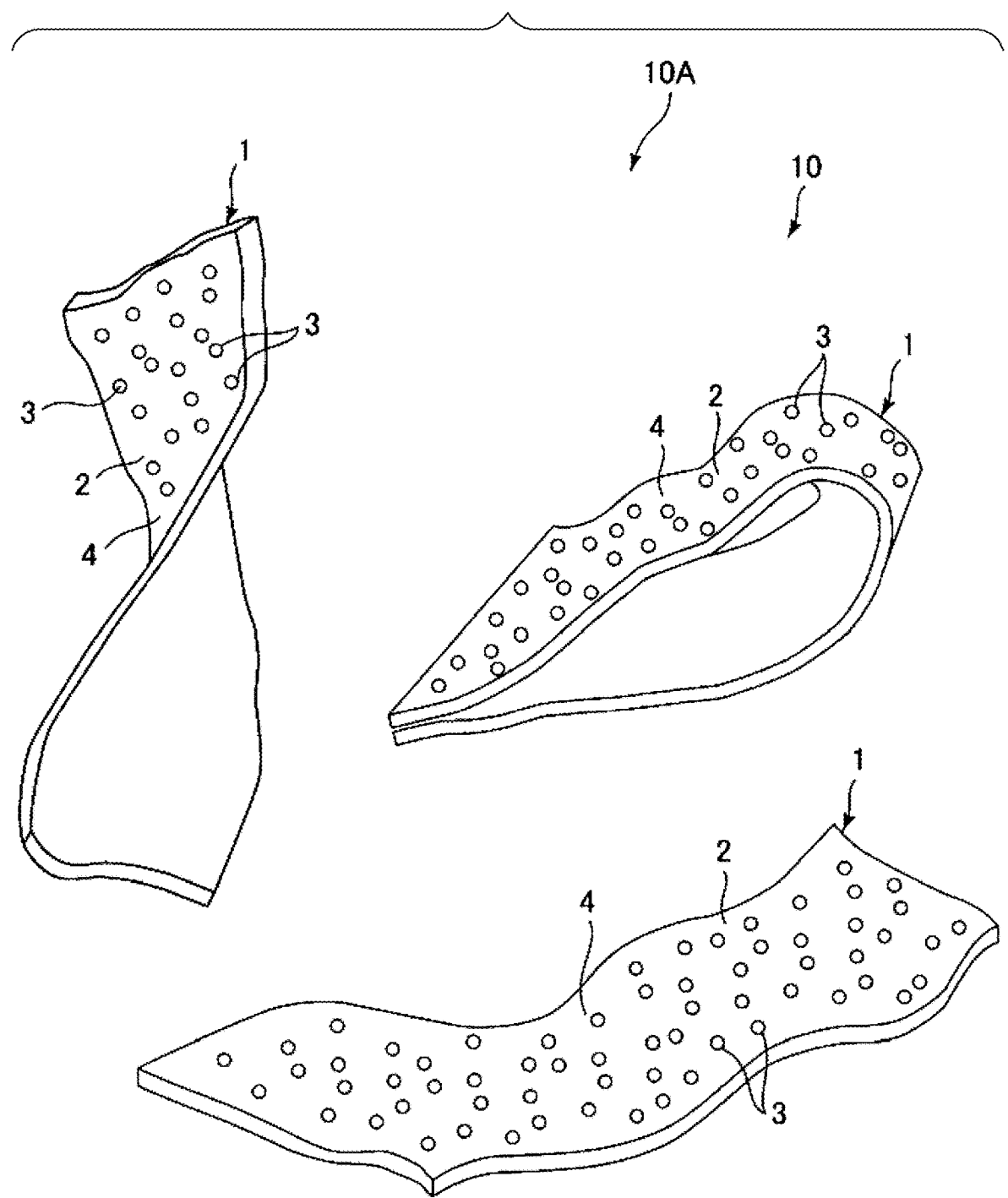
FIG. 1 is a perspective view illustrating an absorbent composite according to a first embodiment.
Figure 2:
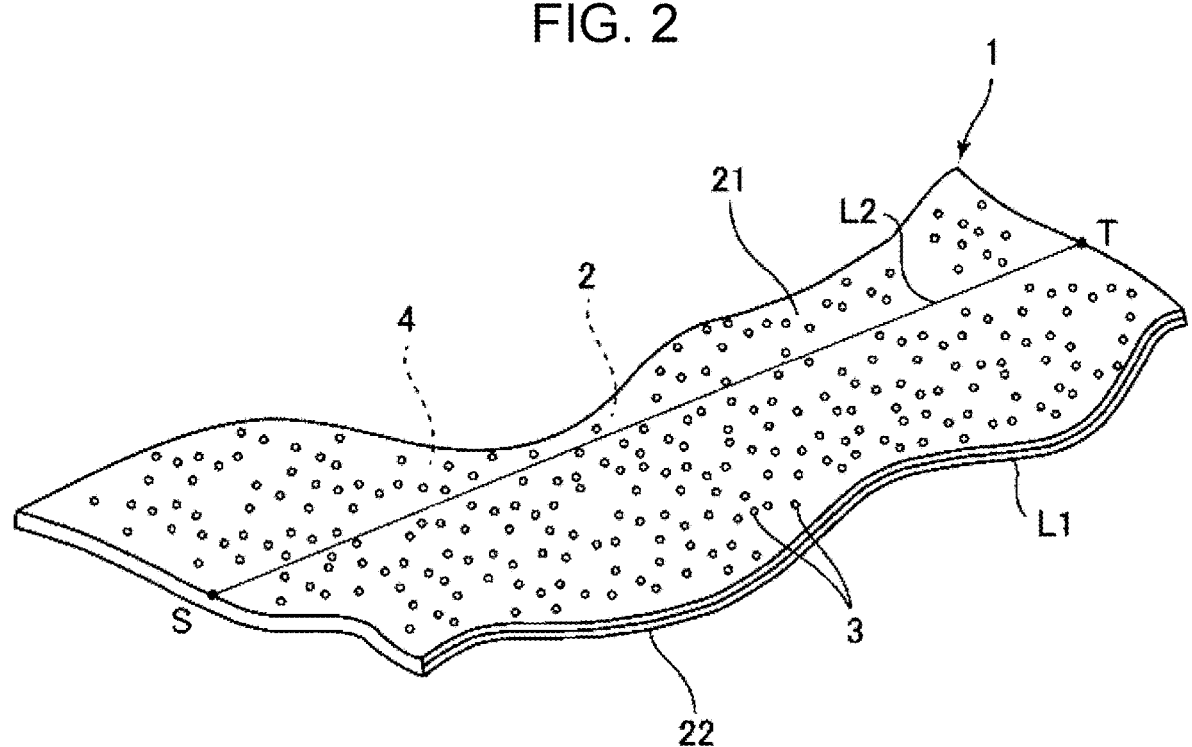
FIG. 2 is a perspective view illustrating an example of a small piece provided in the absorbent composite according to the first embodiment.
Figure 3:
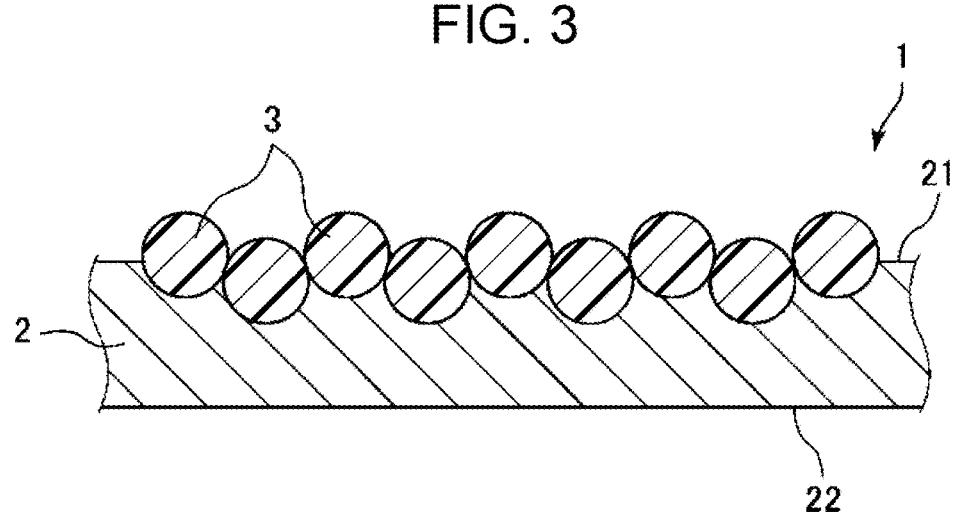
FIG. 3 is a cross-sectional view of the small piece provided in the absorbent composite according to the first embodiment.
Figure 4:
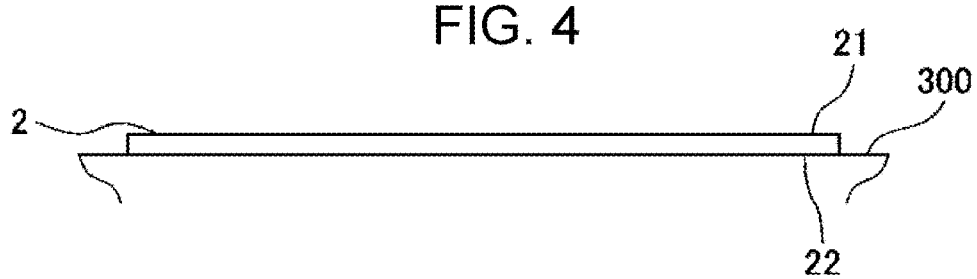
FIG. 4 is a view illustrating a manufacturing step of manufacturing the absorbent composite according to the first embodiment, and illustrating a state where a fiber base material is placed on a placement table.
Figure 5:
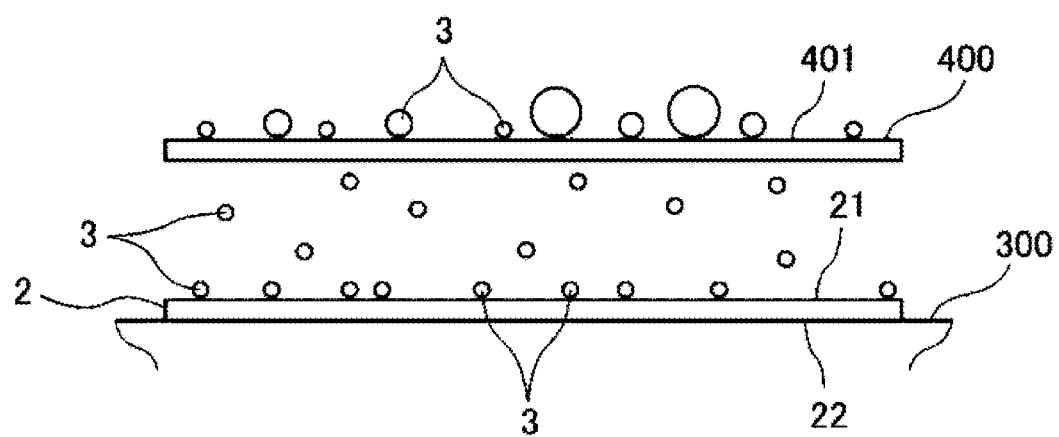
FIG. 5 is a view illustrating a manufacturing step of manufacturing the absorbent composite according to the first embodiment, and illustrating a state where a water absorbent resin is applied.
Figure 6:
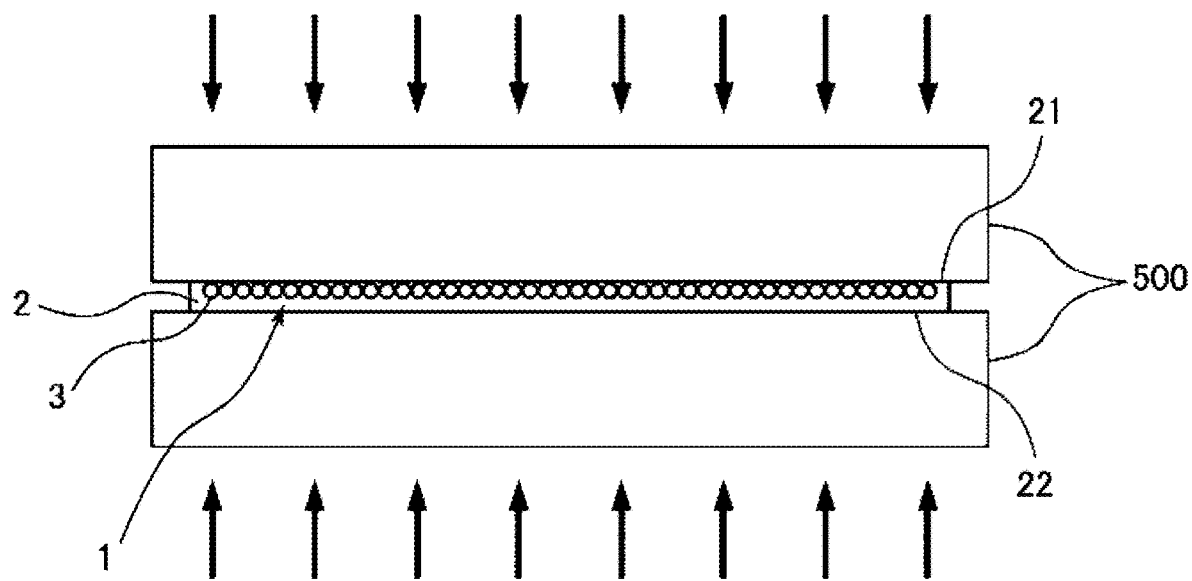
FIG. 6 is a view illustrating a manufacturing step of manufacturing the absorbent composite according to the first embodiment, and illustrating a state where a sheet-like fiber base material is heated and pressed.
Figure 7A:
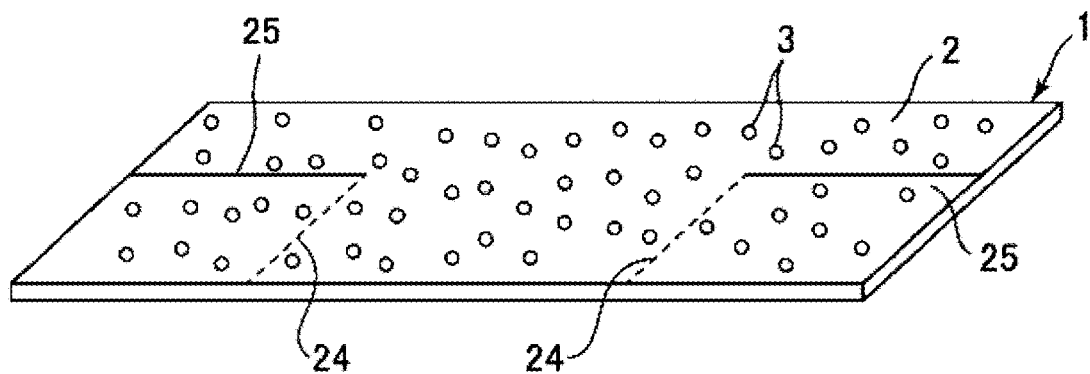
FIGS. 7A and 7B are perspective views illustrating another example of a small piece provided in the absorbent composite according to the first embodiment.
Figure 7B:
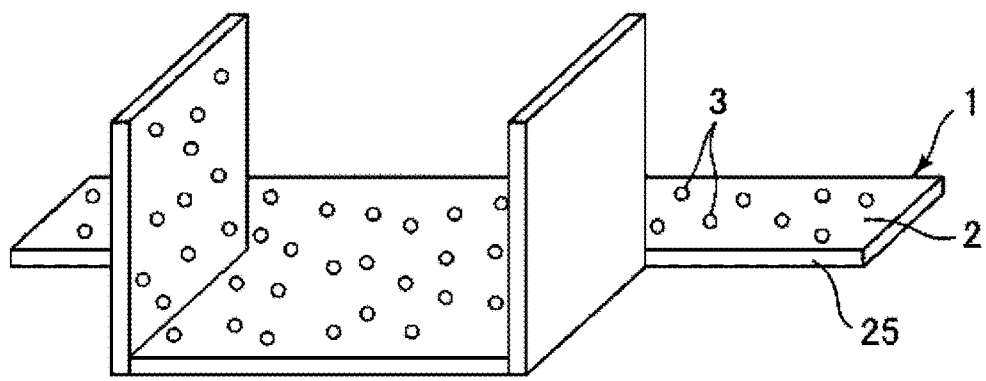

FIG. 1 is a perspective view illustrating an absorbent composite according to a first embodiment. FIG. 2 is a perspective view illustrating an example of a small piece provided in the absorbent composite according to the first embodiment. FIG. 3 is a cross-sectional view of the small piece provided in the absorbent composite according to the first embodiment. FIG. 4 is a view illustrating a manufacturing step of manufacturing the absorbent composite according to the first embodiment, and illustrating a state where a fiber base material is placed on a placement table. FIG. 5 is a view illustrating a manufacturing step of manufacturing the absorbent composite according to the first embodiment, and illustrating a state where a water absorbent resin is applied. FIG. 6 is a view illustrating a manufacturing step of manufacturing the absorbent composite according to the first embodiment, and illustrating a state where a sheet-like fiber base material is heated and pressed. FIGS. 7A and 7B are perspective views illustrating another example of a small piece provided in the absorbent composite according to the first embodiment.

Hereinafter, for convenience of description, upper sides in FIGS. 1 to 7 are referred to as "upper" or "upward", and lower sides are referred to as "lower" or "downward". The same applies to FIGS. 8 to 11 described later.

As shown in FIGS. 1 to 3, an absorbent composite 10A includes a small piece aggregate 10 provided with a plurality of small pieces 1 of shapes (longitudinal shapes) with longitudinal directions, which have fibers and water absorbent resins 3.

In the absorbent composite 10A, when a total length in the longitudinal direction of the small piece 1 is L1 [mm] and a distance between end points connecting one end and the other end of the small piece 1 is L2 [mm], an average value of L2/L1 for the plurality of small pieces 1 forming the absorbent composite 10A is greater than 0 and 0.950 or less.

The absorbent composite 10A is normally used by filling a predetermined container such as a container 9 in an ink absorber 100 as described later.

Since the absorbent composite 10A is not a composite previously formed into a predetermined shape such as a block or the like, and is an aggregate of the small pieces 1, when filling in the container, a relative positional relationship between the small pieces 1 can be changed, and a shape of the entire absorbent composite 10A changes in accordance with a shape of a storage space of the container. Therefore, in the container, it is possible to effectively prevent occurrence of unintentional variations in density. In particular, not only for containers of specific shapes and sizes, containers of various shapes can be filled at a desired density while effectively preventing the occurrence of unintentional variations in density. As a result, the absorption efficiency of the water-containing liquid in the absorbent composite 10A in a state of being stored in the container can be made excellent.

Figure 11:
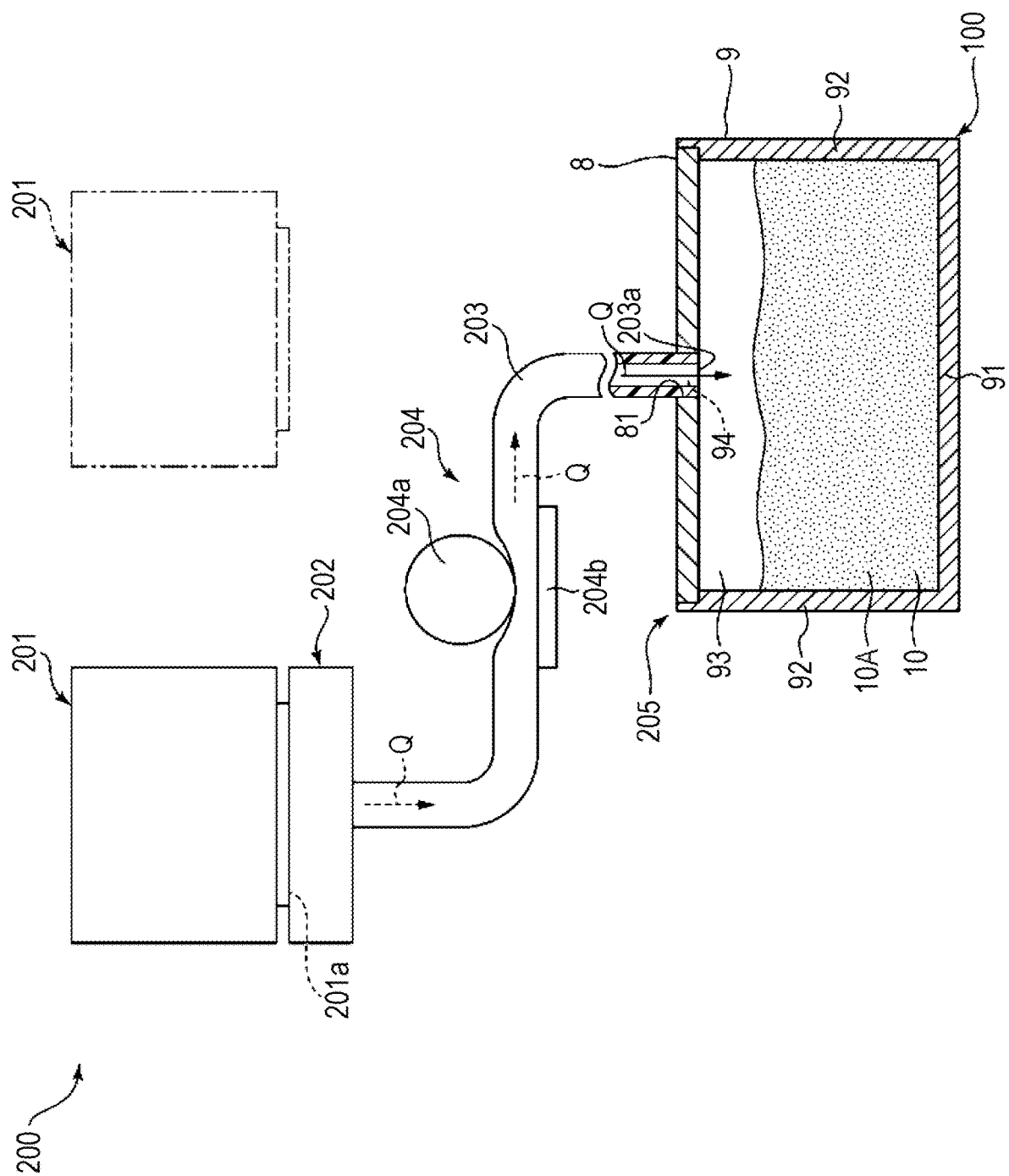
FIG. 11 is a partial vertical cross-sectional view illustrating an example of an ink absorber and a printing apparatus using the absorbent composite as an ink absorbent material.

In addition, when the average value of L2/L1 is a value within the above range, an appropriate gap is formed between the small pieces 1 in the absorbent composite 10A, and adjustment of the bulk density of the absorbent composite 10A is can be performed more easily. In addition, the shape of the absorbent composite 10A can be changed more freely. Therefore, for example, as shown in FIG. 11 referred to in the description to be described later, a desired amount of the absorbent composite 10A can be suitably stored in the container, and it is possible to effectively prevent the occurrence of unintentional unevenness in the absorption characteristics of the liquid at each portion in the container. Therefore, the absorption efficiency of the water-containing liquid in the absorbent composite 10A in the state of being stored in the container can be made particularly excellent.

In such a stored state, a gap is likely to be formed between the small pieces 1. As a result, the liquid can pass through the gap, and if the gap is too small, the liquid can wet and spread by capillary phenomenon, that is, the permeability of the liquid can be ensured. As a result, the liquid flowing downward in the container is prevented from being blocked in the middle, and thus can penetrate into the bottom portion of the container. As a result, each of the small pieces 1 can suitably absorb the liquid and hold the liquid.

On the other hand, when the above conditions are not satisfied, the above excellent effects cannot be obtained. For example, when the average value of L2/L1 exceeds 0.950, since the shape of the small piece is more flat, a sufficient gap is not formed between the small pieces, and it is difficult to adjust the bulk density of the small piece aggregate. As a result, it is difficult to increase the absorption efficiency of the liquid.

As shown in FIG. 2, the total length L1 in the longitudinal direction of the small piece 1 is a length of a line segment connecting one end and the other end of the small piece 1 in the longitudinal direction along the small piece 1, that is, a length in the longitudinal direction when the small piece 1 is curved or bent and is corrected to be flat.

In addition, the distance L2 between end points connecting one end and the other end of the small piece 1 is a length of a line connecting the one end and the other end of the small piece 1 with the shortest distance.

The dimensions of the small piece 1 can be measured, for example, using a digital microscope such as VHX-5000 manufactured by Keyence Corporation.

As the total length L1, for example, a middle point in the thickness direction of each small piece 1 can be measured at multiple points for each deformation point, and a length of multiple point connection can be adopted.

As the distance L2 between the end points, for example, the distance between the two points when measuring two points at one end and the other end of the small piece 1 such as points S and T in FIG. 2 can be adopted.

As L2/L1 is closer to 1, it can be said that the small piece 1 is flat. The L1 and the L2 satisfy the relationship of L2≤L1, the L1 is a positive value, and the minimum value of L2 is zero. When one end of the small piece 1 is in contact with the other end, and the small piece 1 is in the form of two folds or a ring, the L2=0. Therefore, L2/L1 can be rephrased as the flatness of the small piece 1, the larger the value of L2/L1, the greater the flatness, and the smaller the value of L2/L1, the smaller the flatness, that is, the greater the degree of deformation.

The average value of L2/L1 may be greater than 0 and 0.950 or less, preferably 0.150 or greater and 0.945 or less, more preferably 0.300 or greater and 0.940 or less, and still more preferably 0.500 or greater and 0.930 or less.

As a result, the flatness of each of the small pieces 1 constituting the absorbent composite 10A is appropriate, an appropriate gap is formed between the small pieces 1, and, as a result, the above-described effect is effectively exhibited.

As the average value of L2/L1, the total length L1 in the longitudinal direction and the distance L2 between the end points are respectively measured for two or more predetermined numbers of small pieces 1 randomly extracted from the absorbent composite 10A, L2/L1 is determined, and the average value thereof is adopted.

Specifically, for example, two or more predetermined numbers, for example, sixteen small pieces 1 are randomly extracted from the absorbent composite 10A, L2/L1 for the extracted small pieces 1 are obtained, and the average value thereof can be adopted as the average value of L2/L1.

In addition, for example, a microscope or the like, an absorbent composite including a plurality of small pieces 1 is photographed using a charge coupled device (CCD) camera to obtain L2/L1 for the plurality of small pieces 1 included in a visual field range, and the average value thereof can be adopted as the average value of L2/L1.

The small piece 1 constituting the absorbent composite 10A may have a curved shape, a bent shape, a twisted shape, or a spiral shape. In addition, the small piece 1 may have a combination thereof.

As a result, in the small piece aggregate 10 constituting the absorbent composite 10A, a gap is suitably ensured between the small pieces 1 and it is possible to more easily adjust the bulk density of the absorbent composite 10A. In addition, the shape of the absorbent composite 10A can be changed more freely. Therefore, the desired amount of the absorbent composite 10A can be stored more suitably in the container, and the occurrence of unevenness in the absorption characteristics of the liquid can be more effectively prevented.

Hereinafter, the configuration of the small piece 1 constituting the absorbent composite 10A will be described.

The absorbent composite 10A includes a small piece aggregate 10 which is an aggregate of small pieces 1 of shapes (longitudinal shapes) with longitudinal directions, which have fibers and the water absorbent resins 3. The longitudinal shape means a shape having an aspect ratio of 1.5 or more.

In the present specification, "water absorption" refers to absorbing water itself or a liquid containing water such as ink or body fluids. In addition, in the present specification, "liquid" refers to water itself or the liquid containing water such as ink or body fluids, unless otherwise specified. In particular, examples of a preferable liquid include a liquid containing water at a content of 50% by mass or more.

The small piece 1 has a fiber base material 2 containing fibers, and a water absorbent resin 3 carried on at least one surface side of the fiber base material 2.

Since the water absorbent resin 3 is carried on at least one surface side of the fiber base material 2, the liquid reached a surface of the fiber base material 2 on which the water absorbent resin 3 is carried, in particular, a surface 21 on a front side in the configuration shown in FIG. 3, can be absorbed, and the liquid reached an opposite surface 22 on a rear side can be rapidly propagated and penetrated.

In the illustrated configuration, although the water absorbent resin 3 is carried only on one surface side of the fiber base material 2, the water absorbent resin 3 may be carried on both sides of the fiber base material 2, that is, on the surface 21 on the front side and on the surface 22 on the rear side. In this case, it is preferable that the adhesion amount of the water absorbent resin 3 differs between the surface 21 on the front side and the surface 22 on the rear side. As a result, the absorption and propagation of the liquid can be adjusted more suitably. Fiber base material The fiber base material 2 is a support body that carries on the water absorbent resin 3 on the surface thereof. The water absorbent resin 3 can be suitably carried on the fiber base material 2, and the detachment of the water absorbent resin 3 from the fiber base material 2 can be more suitably prevented. In addition, when the liquid is applied to the small piece 1, the fiber base material 2 temporarily holds the liquid, and thereafter the water absorbent resin 3 can be efficiently fed, and the absorption characteristics of the liquid of the entire small piece 1 can be improved. In addition, in general, fibers such as cellulose fibers are inexpensive than the water absorbent resin 3 and are also advantageous from the viewpoint of reducing the production cost of the small piece 1. In particular, when fibers derived from a waste paper are used, the above effects are more significantly exhibited. In addition, it is also advantageous from the viewpoint of waste reduction and effective use of resources.

Examples of the fibers constituting the fiber base material 2 include synthetic resin fibers such as polyester fibers and polyamide fibers; natural resin fibers such as cellulose fibers, keratin fibers and fibroin fibers, and chemically modified products thereof, or the like, and these may be used alone or in appropriate mixtures. It is preferable to use mainly cellulose fibers, and it is more preferable that substantially all of the fibers are cellulose fibers.

Since cellulose is a material having a suitable hydrophilic property, when a liquid is applied to the small piece 1, the liquid can be suitably taken in, a state of a particularly high fluidity, for example, of a viscosity of 10 mPa·s or less can be rapidly released, and the liquid once taken in can be suitably fed into the water absorbent resin 3. As a result, it is possible to make the absorption characteristics of the liquid of the entire small piece 1 particularly excellent. In addition, since cellulose has normally a high affinity to the water absorbent resin 3, the water absorbent resin 3 can be more suitably carried on the surface of the fiber. In addition, the cellulose fiber is a renewable natural material, and among various types of fibers, it is inexpensive and easily available, so that it is also advantageous from the viewpoints of reduction of production cost of small piece 1, stable production, reduction of environmental load, and the like.

In the present specification, the cellulose fiber may be any fiber having cellulose as a compound as the main component and having a fibrous shape, and may contain hemicellulose and lignin in addition to cellulose.

The average length of the fibers is not particularly limited, and is preferably 0.1 mm or more and 7 mm or less, more preferably 0.1 mm or more and 5 mm or less, and still more preferably 0.1 mm or more and 3 mm or less. The average width of the fibers is not particularly limited, and is preferably 0.05 mm or more and 2 mm or less, and more preferably 0.1 mm or more and 1 mm or less.

The average aspect ratio, that is ratio of average length to average width of the fibers is not particularly limited, and is preferably 10 or more and 1,000 or less, and more preferably 15 or more and 500 or less.

According to the above numerical range, it is possible to more suitably carry on the water absorbent resin 3, hold the liquid by the fibers, and feed the liquid into the water absorbent resin 3, and it is possible to make the absorption characteristics of the liquid of the entire small piece 1 more excellent.

Water Absorbent Resin

The water absorbent resin 3 which is a component of the absorbent composite 10A may be any resin having a water absorbency and is not particularly limited. Examples thereof include carboxymethyl cellulose, polyacrylic acid, polyacrylamide, starch-acrylic acid graft copolymer, hydrolyzate of starch-acrylonitrile graft copolymer, vinyl acetate-acrylic ester copolymer, copolymer of isobutylene and maleic acid, hydrolyzate of acrylonitrile copolymer or acrylamide copolymer, polyethylene oxide, polysulfonic acid compound, polyglutamic acid, salts thereof, crosslinked products thereof, and the like. Here, the water absorbency refers to the function of having hydrophilicity and holding water. Many of the water absorbent resins 3 gel when absorbed by water.

Among these, the water absorbent resin 3 is preferably a resin having a functional group in the side chain. Examples of the functional group include an acid group, a hydroxyl group, an epoxy group, an amino group, and the like.

In particular, the water absorbent resin 3 is preferably a resin having an acid group in the side chain, and more preferably a resin having a carboxyl group in the side chain.

Examples of the carboxyl group-containing unit constituting the water absorbent resin 3 include acrylic acid, methacrylic acid, itaconic acid, maleic acid, crotonic acid, fumaric acid, sorbic acid, cinnamic acid, and those derived from monomers such as anhydrides and salts thereof.

When the absorbent composite 10A includes the water absorbent resin 3 having an acid group in the side chain, the proportion of acid groups contained in the water absorbent resin 3 which are neutralized to form a salt is preferably 30 mol % or more and 100 mol % or less, more preferably 50 mol % or more and 95 mol % or less, still more preferably 60 mol % or more and 90 mol % or less, and most preferably 70 mol % or more and 80 mol % or less.

As a result, the liquid absorbing property by the absorbent composite 10A can be made more excellent.

The type of the salt for neutralization is not particularly limited, examples thereof include alkali metal salts such as sodium salts, potassium salts and lithium salts, salts of nitrogen-containing basic substances such as ammonia, and the like, and sodium salts are preferred.

As a result, the liquid absorbing property by the absorbent composite 10A can be made more excellent.

The water absorbent resin 3 having an acid group in the side chain is preferable because electrostatic repulsion between the acid groups occurs at the time of liquid absorption, and an absorption rate is fast. In addition, when the acid group is neutralized, the liquid is likely to be absorbed inside the water absorbent resin due to osmotic pressure.

The water absorbent resin 3 may have a structural unit not containing an acid group, and examples of the structural unit include a hydrophilic structural unit, a hydrophobic structural unit, and structural unit containing a polymerizable crosslinking agent, and the like.

Examples of the hydrophilic structural unit include structural units derived from nonionic compounds such as acrylamide, methacrylamide, N-ethyl (meth) acrylamide, N-n-propyl (meth) acrylamide, N-isopropyl (meth) acrylamide, N, N-dimethyl (meth) acrylamide, 2-hydroxyethyl (meth) acrylate, 2-hydroxypropyl (meth) acrylate, methoxypolyethylene glycol (meth) acrylate, polyethylene glycol mono (meth) acrylate, N-vinyl pyrrolidone, N-acryloyl piperidine, and N-acryloyl pyrrolidine.

Examples of the hydrophobic structural unit include structural units derived from compounds such as (meth) acrylonitrile, styrene, vinyl chloride, butadiene, isobutene, ethylene, propylene, stearyl (meth) acrylate, and lauryl (meth) acrylate.

Examples of the structural unit to be the polymerizable crosslinking agent include structural units derived from diethylene glycol diacrylate, N, N'-methylene bisacrylamide, polyethylene glycol diacrylate, polypropylene glycol diacrylate, trimethylolpropane diallyl ether, trimethylolpropane triacrylate, allyl glycidyl ether, pentaerythritol triallyl ether, pentaerythritol diacrylate monostearate, bisphenol A diacrylate, isocyanuric acid diacrylate, tetraallyloxyethane, and diallyloxyacetate.

As the water absorbent resin 3, a polyacrylate copolymer or a polyacrylic acid polymer crosslinked product is preferable from the viewpoint of absorption characteristics, cost and the like.

As a polyacrylic acid polymerization crosslinked product, the proportion of a structural unit having a carboxyl group in the total structural units constituting a molecular chain is preferably 50 mol % or more, more preferably 80 mol % or more, and still more preferably 90 mol % or more.

When the proportion of the structural unit containing a carboxyl group is too low, it may be difficult to make the absorption characteristics of the liquid sufficiently excellent.

The carboxyl group in the polyacrylic acid polymerization crosslinked product is preferably partially neutralized to form a salt.

The proportion of neutralized ones in the total carboxyl groups in the polyacrylic acid polymer crosslinked product is preferably 30 mol % or more and 99 mol % or less, more preferably 50 mol % or more and 99 mol % or less, and still more preferably 70 mol % or more and 99 mol % or less.

In addition, the water absorbent resin 3 may have a structure crosslinked by a crosslinking agent other than the above-described polymerizable crosslinking agent.

When the water absorbent resin 3 is a resin having an acid group, for example, a compound having a plurality of functional groups reactive with the acid group can be preferably used as the crosslinking agent.

When the water absorbent resin 3 is a resin having a functional group reactive with the acid group, a compound having a plurality of functional groups reactive with the acid group in the molecule can be suitably used as the crosslinking agent.

Examples of the crosslinking agent which is a compound having the plurality of functional groups reactive with the acid group include glycidyl ether compounds such as ethylene glycol diglycidyl ether, trimethylolpropane triglycidyl ether, (poly) glycerin polyglycidyl ether, diglycerin polyglycidyl ether, and propylene glycol diglycidyl ether; polyhydric alcohols such as (poly) glycerin, (poly) ethylene glycol, propylene glycol, 1,3-propanediol, polyoxyethylene glycol, triethylene glycol, tetraethylene glycol, diethanolamine, and triethanolamine; polyvalent amines such as ethylenediamine, diethylenediamine, polyethyleneimine, and hexamethylenediamine. In addition, polyvalent ions such as zinc, calcium, magnesium, and aluminum can be suitably used because these react with the acid groups of the water absorbent resin 3 to function as a crosslinking agent.

The water absorbent resin 3 may have any shape, for example, scaly, acicular, fibrous, or particulate shape, and the majority thereof is preferably in the form of particles. When the water absorbent resin 3 is in the form of particles, the permeability of the liquid can be easily ensured. In addition, the water absorbent resin 3 can be suitably carried on the fiber base material 2. The particulate shape means that the ratio of the maximum length to the minimum length is 0.7 or more and 1.0 or less.

The average particle diameter of the particles is preferably 10 µm or more and 800 µm or less, more preferably 20 µm or more and 600 µm or less, and still more preferably 30 µm or more and 500 µm or less.

As a result, the effects as described above can be more reliably exhibited.

On the other hand, when the average particle diameter of the particles is too small, the permeability of the liquid to the inside of the absorbent composite 10A is likely to be reduced.

In addition, when the average particle diameter of the particles is too large, a specific surface area of the water absorbent resin 3 is small, the absorption characteristics of the liquid decrease, and the absorption rate of the liquid decreases.

In the present disclosure, the average particle diameter refers to a volume-based average particle diameter. The average particle diameter can be determined, for example, by measurement with a particle diameter distribution measuring device having a laser diffraction and scattering method as a measurement principle, that is, a laser diffraction type particle diameter distribution measuring device.

The particles may contain components other than the water absorbent resin. Examples of such components include surfactants, lubricants, antifoaming agents, fillers, anti-blocking agents, ultraviolet absorbers, and the like.

The water absorbent resin 3 may have a uniform structure as a whole, or may have a different structure at each portion. For example, in the water absorbent resin 3, the area near the surface, more specifically, for example, the area with a thickness of 1 μm from the surface may have a higher degree of cross-linking than that of other portion.

As a result, it is possible to improve an absorption ratio and an absorption rate of the liquid, strength of the water absorbent resin 3, and the like in a more balanced manner.

In addition, the adhesion between the water absorbent resin 3 and the fibers can be made more excellent, and the liquid once held by the fibers can be fed efficiently by the water absorbent resin, and the absorption characteristics of the entire absorbent composite can be further improved.

In addition, as shown in FIG. 3, the water absorbent resin 3 is carried on one surface side of the fiber base material 2. In addition, a portion of the water absorbent resin 3 is penetrated inward from one surface of the fiber base material 2. That is, a portion of the water absorbent resin 3 is impregnated in the fiber base material 2. As a result, the carrying capacity of the water absorbent resin 3 to the fiber base material 2 can be enhanced. Therefore, the water absorbent resin 3 can be prevented from detaching in the container 9. As a result, the high absorption characteristics of the liquid can be exhibited over a long period of time, the water absorbent resin 3 can be prevented from being unevenly distributed in the container 9, and the occurrence of unevenness in the absorption characteristics of the liquid can be prevented.

In the present specification, "impregnation" refers to a state of being embedded in which at least a portion of the particles of the water absorbent resin 3 penetrates inward from the surface of the fiber base material 2. In addition, it is not necessary for all particles to be impregnated. In addition, a state where the particles of the water absorbent resin 3 penetrate in the inside of the fiber base material 2 by softening and come out to the rear surface of the fiber base material 2 is also included.

The content of the water absorbent resin 3 in the small pieces 1 is preferably 25% by mass or more and 300% by mass or less, and more preferably 50% by mass or more and 150% by mass or less with respect to the fiber. As a result, the water absorbency and permeability can be sufficiently ensured.

When the content of the water absorbent resin 3 in the small pieces 1 is too low, the water absorbency may be insufficient. On the other hand, when the content of the water absorbent resin 3 in the small piece 1 is too high, there is a possibility that the expansion coefficient of the small piece 1 tends to increase, and the permeability may be reduced.

In addition, the small pieces 1 may contain components other than those described above.

Examples of such components include surfactants, lubricants, antifoaming agents, fillers, anti-blocking agents, ultraviolet absorbers, colorants such as pigments and dyes, flame retardants, flow improvers, and the like.

The content of the other components in the small piece 1 is preferably 10% by mass or less, and more preferably 5.0% by mass or less.

The average value of the entire length L1 in the longitudinal direction of the small piece 1 is not particularly limited because it depends on the shape and size of the container, and the average value is preferably 1.0 mm or more and 50 mm or less, more preferably 1.5 mm or more and 30 mm or less, and still more preferably 2.0 mm or more and 20 mm or less.

As a result, it is possible to more suitably carry on the water absorbent resin 3, hold the liquid by the fibers, and feed the liquid into the water absorbent resin 3, and it is possible to make the absorption characteristics of the liquid of the entire small piece 1 more excellent. In addition, for example, at the time of manufacturing the absorbent composite 10A, by applying an external force to the small piece 1 as described later, the average value of L2/L1 is more suitably adjusted to be a value within the above range, and an appropriate gap can be formed between the small pieces 1 in the absorbent composite 10A. The entire absorbent composite 10A can be easily deformed, and the shape following property to the container is excellent, and the bulk density of the absorbent composite 10A can be easily adjusted.

On the other hand, when the average value of L1 is less than the lower limit value, it tends to be difficult to form a gap between the small pieces 1 in the absorbent composite 10A, and it is unlikely to adjust the bulk density of the absorbent composite 10A. In addition, at the time of manufacturing the absorbent composite 10A, deformation of the small piece 1 in the longitudinal direction is difficult, and when an external force is applied to the small piece 1, it may be difficult to adjust the average value of L2/L1 to a value within the above range.

In addition, when the average value of L1 exceeds the upper limit value, gaps are likely to be formed excessively between the small pieces 1 in the absorbent composite 10A, and it is unlikely to adjust the bulk density of the absorbent composite 10A.

The average value of the width of the small pieces 1 is not particularly limited, and the average value is preferably 0.1 mm or more and 100 mm or less, more preferably 0.3 mm or more and 50 mm or less, and still more preferably 1 mm or more and 20 mm or less.

The average aspect ratio, which is the ratio of the total length to the width for each small piece 1, is preferably 2.0 or more and 200 or less, and more preferably 2.5 or more and 30 or less.

The average value of the thickness of the small pieces 1 is preferably 0.05 mm or more and 2 mm or less, and more preferably 0.1 mm or more and 1 mm or less.

According to the above numerical range, it is possible to more suitably carry on the water absorbent resin 3, hold the liquid by the fibers, and feed the liquid into the water absorbent resin 3, and it is possible to make the absorption characteristics of the liquid of the entire small piece 1 more excellent. Furthermore, the entire absorbent composite 10A is likely to be deformed, and the shape following property to the container is excellent.

The absorbent composite 10A may include small pieces 1 having different sizes and shapes.

In addition, the absorbent composite 10A may include small pieces 1 in which at least one of the total length, width, aspect ratio, and thickness are the same as each other, or may include different small pieces 1 of all of these.

The content of the small pieces 1 having a maximum width of 3 mm or less in the absorbent composite 10A is preferably 30% by mass or more and 90% by mass or less, and more preferably 40% by mass or more and 80% by mass or less. As a result, the occurrence of unevenness in the absorption characteristics of the liquid can be more effectively prevented.

If the content of the small piece 1 having a maximum width of 3 mm or less is too low, when the absorbent composite 10A is stored in the container, a gap is likely to be formed between the small pieces 1 and there is a concern that unevenness occurs in the absorption characteristics of the liquid in the container. On the other hand, when the content of the small piece 1 having a maximum width of 3 mm or less is too high, it tends to be unlikely to form a gap between the small pieces 1, and it is unlikely to adjust the bulk density of the absorbent composite 10A.

In addition, although the small piece 1 may have an irregular shape when the small piece 1 is made flat by correcting curve or bending, it is preferable that the small piece 1 has a regular shape. Specifically, it is preferable that the small piece 1 is cut (crushed) into a regular shape by a shredder or the like. As a result, unintended unevenness in the bulk density of the absorbent composite 10A is unlikely to occur, and unintended unevenness in the absorption characteristics of the liquid can be prevented in the container. In addition, the small piece 1 cut (crushed) into a regular shape can reduce the area of the cut surface as much as possible. Therefore, it is possible to suppress dust generation due to scattering of fibers and the water absorbent resin 3 while ensuring appropriate absorption characteristics of the liquid.

In the present specification, the "regular shape" refers to, for example, a shape such as a rectangle, a square, a triangle, a polygon such as a pentagon, a circle, an ellipse or the like. In addition, each of the small pieces 1 may have the same size or a similar shape. In addition, for example, in the case of the rectangle, even if the lengths of the sides are different from each other, if it is a category of the rectangle, it has the regular shape.

In addition, in the present specification, the "irregular shape" refers to a shape other than the "regular shape" as described above, such as a shape roughly cut or torn by hand.

The content of the small pieces 1 having regular shapes when the small pieces 1 are made flat by correcting curve and bending as described above is preferably 30% by mass or more, more preferably 50% by mass or more, and still more preferably 70% by mass or more of the entire absorbent composite 10A.

As described above, each of the small pieces 1 has an elongated shape, that is, has a longitudinal direction. The container is filled so that the extension directions of each of the small pieces 1 differ from each other. That is, the plurality of small pieces 1 are stored in the container as an aggregate without regularity so that the extension directions of the small pieces 1 intersect with each other without being aligned. Furthermore, in other words, each of the small pieces 1 is stored at random in a two-dimensional direction or a three-dimensional direction in the container.

In such a stored state, a gap is likely to be formed between the small pieces 1. As a result, the liquid can pass through the gap, and if the gap is too small, the liquid can wet and spread by capillary phenomenon, that is, the permeability of the liquid can be ensured. As a result, the liquid flowing downward in the container is prevented from being blocked in the middle, and thus can penetrate into the bottom portion of the container. As a result, each of the small pieces 1 can suitably absorb the liquid and hold the liquid for a long period of time.

In addition, since each of the small pieces 1 is stored at random, the entire absorbent composite 10A has an increased chance of contacting the liquid, and thus the absorption performance absorbing the liquid is improved. In addition, when the absorbent composite 10A is stored in the container, each of the small pieces 1 can be randomly put into the container, and thus the storing operation can be performed easily and rapidly.

In addition, the bulk density of the absorbent composite 10A is preferably 0.01 g/cm$^3$ or more and 0.50 g/cm$^3$ or less, more preferably 0.05 g/cm$^3$ or more and 0.30 g/cm$^3$ or less, and among these, particularly preferably 0.08 g/cm$^3$ or more and 0.25 g/cm$^3$ or less.

As a result, in the absorbent composite 10A in which L2/L1 satisfies the above conditions, the holding capacity and the permeability of the liquid can be compatible at a higher level.

Next, an example of a method of manufacturing the above-described absorbent composite 10A will be described.

The method of manufacturing the absorbent composite 10A includes a placement step, a heating and pressurizing step, a shredding step, and a bending step.

First, as illustrated in FIG. 4, the placement step of placing the sheet-like fiber base material 2 before being cut into the small piece 1 on a placement table 300 is performed.

A liquid containing water, for example, pure water, is applied to the sheet-like fiber base material 2 from one surface side. Examples of the method of application include application by spray, a method in which the liquid containing water is soaked in a sponge roller, and the sponge roller is rolled on one surface of the sheet-like fiber base material 2, and the like.

Next, as illustrated in FIG. 5, the water absorbent resin 3 is applied onto one surface of the sheet-like fiber base material 2 through a mesh member 400. The mesh member 400 has a mesh 401, the particles larger than the mesh 401 are captured on the mesh member 400 of the water absorbent resin 3, and the particles smaller than the mesh 401 pass through the mesh 401 and are applied onto one surface of the sheet-like fiber base material 2. Here, the water absorbent resin 3 absorbs water to soften.

As described above, by using the mesh member 400, the particle diameter of the water absorbent resin 3 can be made as uniform as possible. Therefore, it is possible to more effectively prevent the occurrence of unevenness in the water absorbency by the location of the fiber base material 2.

In addition, the maximum width of the mesh 401 is preferably 0.06 mm or more and 0.15 mm or less, and more preferably 0.08 mm or more and 0.12 mm or less. As a result, the particle diameter of the water absorbent resin 3 applied to the fiber base material 2 can be suitably adjusted to a value within the above range.

In addition, the shape of the mesh 401 is not particularly limited, and may be any shape such as a triangle, a quadrangle, a polygon of more than these, a circle, or an ellipse.

Next, as shown in FIG. 6, the sheet-like fiber base material 2 to which the water absorbent resin 3 is attached is disposed between a pair of heating blocks 500. The pair of heating block 500 is heated and pressurized in a direction where the pair of heating block 500 approaches, and the heating and pressurizing step of pressurizing the fiber base material 2 in the thickness direction is performed. As a result, the water absorbent resin 3 which is softened by water absorption penetrates in the inner side of the fiber base material 2 by pressurizing, and is dried to be firmly carried on the fiber base material 2 as shown in FIG. 3.

The pressing force in this step is preferably 0.1 kg/cm$^2$ or more and 1.0 kg/cm$^2$ or less, and more preferably 0.2 kg/cm$^2$ or more and 0.8 kg/cm$^2$ or less. In addition, the heating temperature in this step is preferably 80° C. or more and 160° C. or less, and more preferably 100° C. or more and 120° C. or less.

The shredding step of shredding the sheet-like fiber base material 2 on which the water absorbent resin 3 obtained as described above is carried is performed. The shredding step is performed by, for example, finely cutting, coarse crushing, crushing by scissors, a cutter, a mill, a shredder or the like, and by finely tearing by hand.

By applying an external force to the small piece 1 obtained as described above, the bending step is performed to deform the small piece 1. For example, by putting a plurality of small pieces 1 in a bag such as a plastic bag or a paper bag, shaking the whole bag, or crushing or twisting the bag by hand from the outside of the bag, an external force is applied to the inner small piece 1 to deform the small piece 1.

Specifically, when the total length in the longitudinal direction of the small piece 1 is L1 [mm] and the distance between the end points connecting one end and the other end of the small piece 1 is L2 [mm] as described above, the small pieces 1 are deformed so that the average value of L2/L1 for the plurality of small pieces 1 is a value within the range described above.

In addition, as shown in FIGS. 7A and 7B, a half cut 24 and a cut 25 may be provided on the small piece 1.

As a result, when an external force is applied to the small piece 1 at the time of manufacturing the absorbent composite 10A, the small piece 1 is likely to be bent at the half cut 24 or at the portion where the width is reduced by the cut 25 so that the small piece 1 can be suitably and easily deformed. FIG. 7A shows a state before bending the small piece 1, that is, a case where the small piece 1 is flat, and FIG. 7B shows a state after bending the small piece 1. As shown in these drawings, by applying an external force to the small piece 1, a portion of the small piece 1 rises in a tongue shape by the half cut 24 and the cut 25 so that the L2/L1 value can be adjusted more suitably.

In the configuration shown in FIGS. 7A and 7B, although both the half cut 24 and the cut 25 are provided in the single small piece 1, the same effect as described above can be obtained even when only one of these is provided. In addition, the half cut 24 may be provided in a portion of the plurality of small pieces 1 constituting the absorbent composite 10A, and the cut 25 may be provided in another portion of the small pieces 1.

In addition, when the sheet-like fiber base material 2 is cut and crushed by a shredder, deformation such as twist or shear may occur in the small pieces 1. For example, shredding is performed using a cross cut shredder which adds a function to cut horizontally at each fixed interval to a straight cut cutting vertically, a micro cross cut shredder with a small cutting size among the cross cut methods, a spiral cut shredder with a function of cutting vertically with a spiral cutter after straight-cutting vertically, and the like. Therefore, deformation such as twisting can be caused to the small pieces 1 at the time of coarse crushing.

As the micro cross cut shredder in this manner, for example, SeCuret series F3143SP manufactured by Ishizawa Seisakusho Co., Ltd. can be used.

Furthermore, for example, by using a mill that coarsely crushes and crushes the fiber base material 2 by rotation of a cutting blade in the container, or a high speed mill which rotates the cutting blade at high speed, the small piece 1 can also be deformed by twisting or the like at the time of coarse crushing.

As such a high speed mill, for example, HBGL manufactured by UNIWORLD Co. Ltd can be used.

The absorbent composite 10A is used by, for example, measuring a desired amount, adjusting the bulk density by manual loosening or the like, and storing the absorbent composite 10A in a predetermined container.

The number of pieces of the small pieces 1 stored in the container is not particularly limited, and for example, the necessary number of pieces may be appropriately selected according to various conditions such as the use of the absorber. The maximum absorption amount of the liquid in the absorbent composite 10A is adjusted depending on the size of the storage amount of the small pieces 1.

In addition, the absorbent composite 10A may include a configuration other than the small piece 1. For example, fibers as defibrated materials, a water absorbent resin not carried on the fibers, or a small piece of fibers not carrying the water absorbent resin may be included. However, the content of the components other than the small pieces 1 in the absorbent composite 10A is preferably 10% by mass or less, more preferably 5% by mass or less, and still more preferably 1% by mass or less.

Second Embodiment

Figure 8:
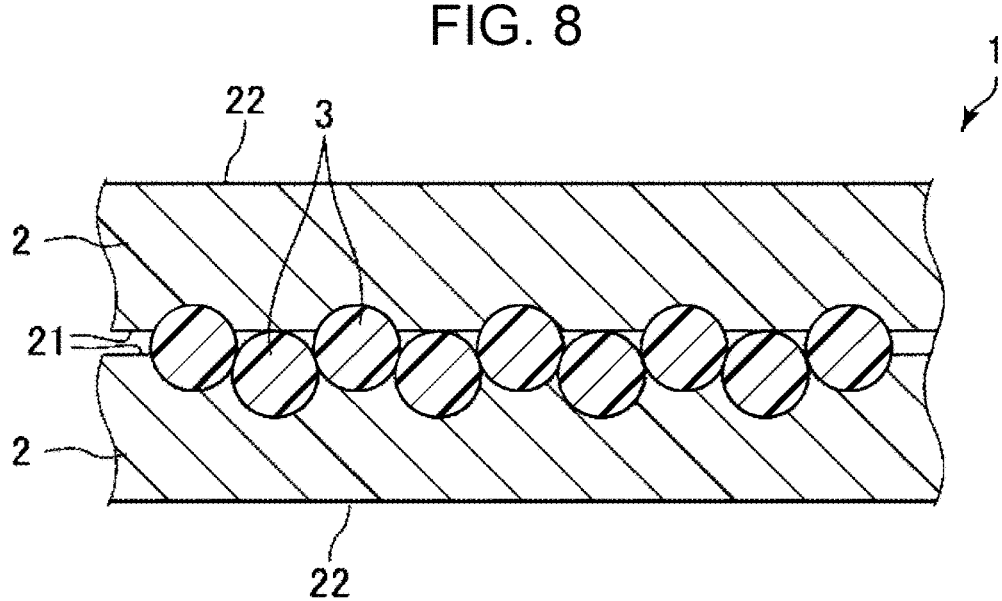
FIG. 8 is a cross-sectional view of a small piece provided in an absorbent composite according to a second embodiment.

FIG. 8 is a cross-sectional view of a small piece provided in an absorbent composite according to a second embodiment.

Figure 9:
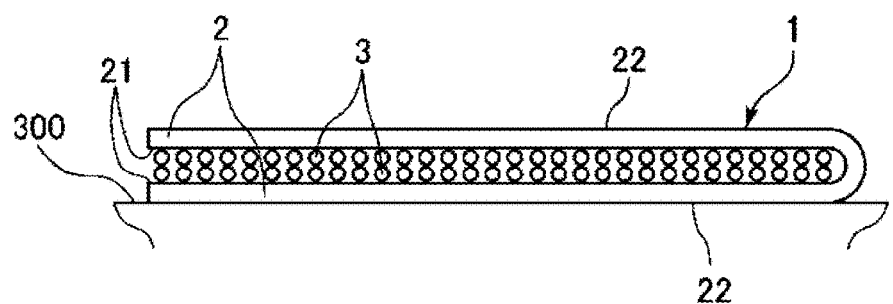
FIG. 9 is a view illustrating a manufacturing step of manufacturing the absorbent composite according to the second embodiment, and illustrating a state where a sheet-like fiber base material is bent after being applied with a water absorbent resin.
Figure 10:
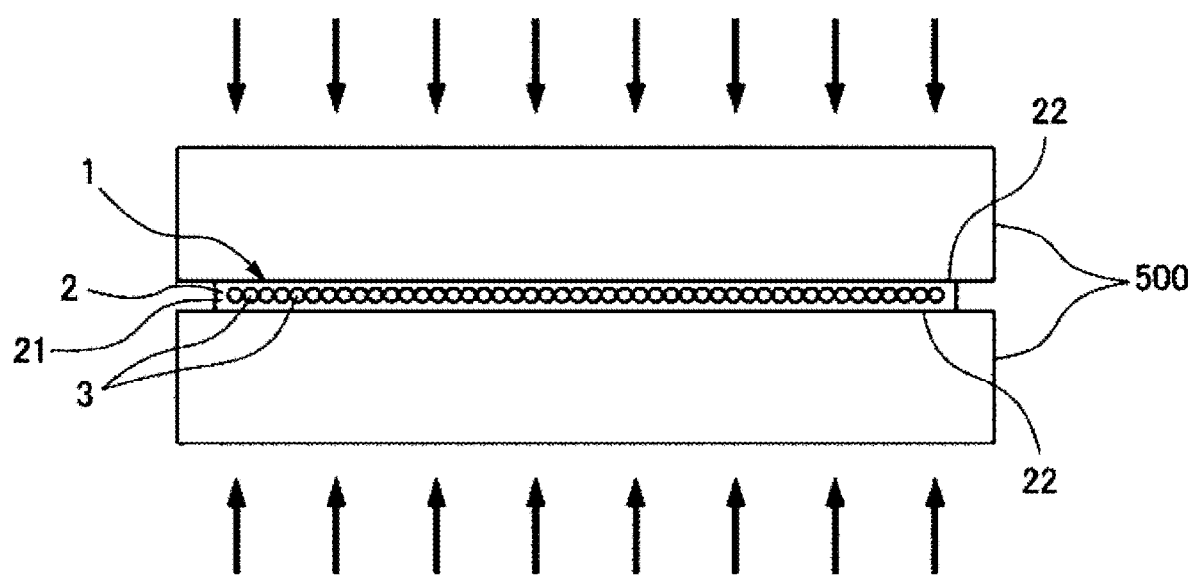
FIG. 10 is a view illustrating a manufacturing step of manufacturing the absorbent composite according to the second embodiment, and illustrating a state where the sheet-like fiber base material is heated and pressed.

FIG. 9 is a view illustrating a manufacturing step of manufacturing the absorbent composite according to the second embodiment, and illustrating a state where a sheet-like fiber base material is bent after being applied with a water absorbent resin. FIG. 10 is a view illustrating a manufacturing step of manufacturing the absorbent composite according to the second embodiment, and illustrating a state where the sheet-like fiber base material is heated and pressed.

Hereinafter, the second embodiment of the absorbent composite 10A will be described with reference to these drawings, differences from the above-described embodiment will be mainly described, and the same matters will not be described.

As shown in FIG. 8, in the present embodiment, the small piece 1 has two fiber base materials 2. The water absorbent resin 3 is provided between these fiber base materials 2. In other words, in the present embodiment, the small pieces 1 have a plurality of stacked fiber base materials 2, and the water absorbent resin 3 is provided between each of the fiber base materials 2.

As a result, the water absorbent resin 3 has a configuration in which each of the fiber base materials 2 is interposed and covered, and is prevented from being exposed to the outer surface of the small piece 1. As a result, the water absorbent resin 3 is more effectively prevented from detaching the fiber base material 2. Therefore, the high absorption characteristics of the liquid can be exhibited over a longer period of time, the water absorbent resin 3 can be more effectively prevented from being unevenly distributed in the container, and the occurrence of unevenness in the absorption characteristics of the liquid can be more effectively prevented.

In the illustrated configuration, although the small piece 1 has two fiber base materials 2 and the water absorbent resin 3 is disposed between these fiber base materials 2, for example, the small piece 1 may have three or more fiber base materials 2, and the water absorbent resin 3 may be disposed between these each of the fiber base materials 2.

Next, a method of manufacturing the absorbent composite 10A according to the present embodiment will be described.

The present manufacturing method has a displacement step, a pinching step, a heating and pressurizing step, a shredding step, and a bending step. The displacement step, the shredding step, and the bending step are the same as those in the above-described embodiment, and thus the description thereof will not be repeated.

As shown in FIG. 9, in the pinching step, the sheet-like fiber base material 2 to which the water absorbent resin 3 is applied is bent in half, so that the fiber base material 2 covers both surface sides of the water absorbent resin 3 arranged in layers.

Next, as shown in FIG. 10, the folded sheet-like fiber base material 2, in other words, a stacked body in which the fiber base material 2 is disposed on both surface sides of the water absorbent resin 3 arranged in layers, is placed between a pair of heating blocks 500. The pair of heating block 500 is heated and pressurized in a direction where the pair of heating block 500 approaches, and the heating and pressurizing step of pressurizing the fiber base material 2 in the thickness direction is performed. As a result, the water absorbent resin 3 which is softened by water absorption penetrates in the inner side of the fiber base material 2 by pressurizing, and is dried. In addition, at this time, drying is performed in a state where the water absorbent resins 3 which are bent and overlapped are joined.

According to such a manufacturing method, the fiber base material 2 can be stacked by a simple method of applying and bending the water absorbent resin 3 on one fiber base material 2. That is, an operation of respectively applying the water absorbent resin 3 to two fiber base material 2 can be omitted. Therefore, the manufacturing step can be simplified.

Furthermore, in the heating and pressurizing step, since the surface of the fiber base material 2 in contact with the heating block 500 is a surface to which the water absorbent resin 3 is not attached, it is possible to prevent the water absorbent resin 3 from adhering to the heating block 500. Therefore, a cleaning step of the heating block 500 can be omitted, and the productivity is excellent.

Ink Absorber and Printing Apparatus

Next, an ink absorber and a printing apparatus using the absorbent composite of the present disclosure as an ink absorbent material will be described.

FIG. 11 is a partial vertical cross-sectional view illustrating an example of an ink absorber and a printing apparatus using the absorbent composite as an ink absorbent material.

The ink absorber 100 shown in FIG. 11 is provided with the absorbent composite 10A as the ink absorbent material, the container 9 storing the absorbent composite 10A, and a lid 8 sealing the container 9. As a result, it is possible to obtain the ink absorber 100 capable of exerting the effects of the above-described absorbent composite 10A.

In the present specification, "ink absorption" refers to absorbing the entire ink such as a solvent-based ink in which a binder is dissolved in a solvent, an UV curable ink in which a binder is dissolved in a liquid monomer which is cured by UV irradiation, and a latex ink in which a binder is dispersed in a dispersion medium, as well as absorbing an aqueous ink in which a coloring material is dissolved in an aqueous solvent. In particular, the present disclosure is preferably applied to an ink having a water content of 50% by mass or more.

The printing apparatus 200 illustrated in FIG. 11 is, for example, an ink jet type color printer. The printing apparatus 200 is provided with a recovery unit 205 that recovers the waste liquid of the ink Q, and the ink absorber 100 is installed in the recovery unit 205. As a result, it is possible to obtain the printing apparatus 200 capable of exhibiting the effects of the ink absorber 100 described above.

The printing apparatus 200 includes an ink ejection head 201 ejecting the ink Q, a capping unit 202 preventing clogging of nozzles 201a of the ink ejection head 201, a tube 203 coupling the capping unit 202 and the ink absorber 100, a roller pump 204 transferring the ink Q from the capping unit 202, and the recovery unit 205.

The ink ejection head 201 has a plurality of nozzles 201a ejecting the ink Q downward. The ink ejection head 201 can eject the ink Q and perform printing while moving relative to a recording medium (not illustrated) such as a PPC sheet.

The capping unit 202 collectively sucks each of the nozzles 201a by the operation of the roller pump 204 when the ink ejection head 201 is in a standby position, and prevents clogging of the nozzles 201a.

The tube 203 is a tube passing the ink Q sucked through the capping unit 202 toward the ink absorber 100. The tube 203 is flexible.

The roller pump 204 is disposed in the middle of the tube 203, and includes a roller portion 204a and a pinching portion 204b which pinches the middle of the tube 203 between the pinching portion 204b and the roller portion 204a. The rotation of the roller portion 204a generates a suction force on the capping unit 202 via the tube 203. The roller portion 204a keeps rotating, so that the ink Q adhering to the nozzle 201a can be fed to the recovery unit 205.

In the recovery unit 205, the ink absorber 100 in which the absorbent composite 10A is stored as an ink absorbing material is installed. The ink Q is fed into the ink absorber 100 and absorbed by the absorbent composite 10A in the ink absorber 100 as the waste liquid. The ink Q contains ink of various colors.

As illustrated in FIG. 11, the ink absorber 100 is provided with the absorbent composite 10A, the container 9 storing the absorbent composite 10A, and the lid 8 sealing the container 9.

The ink absorber 100 is detachably attached to the printing apparatus 200, and in the attached state, is used to absorb the waste liquid of the ink Q as described above. As described above, the ink absorber 100 can be used as a so-called "waste liquid tank". When the absorption amount of the ink Q of the ink absorber 100 reaches the limit, the ink absorber 100 can be replaced with a new ink absorber 100. A detection unit (not illustrated) in the printing apparatus 200 detects whether or not the absorption amount of the ink Q of the ink absorber 100 reaches the limit. In addition, when the absorption amount of the ink Q of the ink absorber 100 reaches the limit, that effect is notified by, for example, a notification unit such as a monitor incorporated in the printing apparatus 200.

The container 9 is a container storing the absorbent composite 10A, that is, the small piece aggregate 10. The container 9 has a box shape having a bottom portion 91 having, for example, a rectangular shape in a plan view and four side wall portions 92 erected upward from each side of the bottom portion 91. The absorbent composite 10A can be stored in a storage space 93 surrounded by the bottom portion 91 and the four side wall portions 92.

The container 9 is not limited to the one having the bottom portion 91 having a square shape in a plan view, may have, for example, the bottom portion 91 having a circular shape in a plan view, and the whole may be cylindrical.

The container 9 is hard, in other words, has a shape-retaining property such that the volume does not change by 10% or more when an internal pressure or an external force acts on the container 9. As a result, the container 9 can maintain the shape of the container 9 itself even if each of the small pieces 1 of the absorbent composite 10A absorbs the ink Q, and thereafter expands to receive the force from the small piece 1 from the inside. Therefore, the installation state of the container 9 in the printing apparatus 200 is stabilized, and each of the small pieces 1 can stably absorb the ink Q.

The container 9 may be made of a material that does not transmit the ink Q, and although the constituent material is not particularly limited, various resin materials such as cyclic polyolefin and polycarbonate can be used, for example. In addition, as the constituent material of the container 9, various metal materials such as aluminum and stainless steel can be used in addition to the various resin materials, for example.

In addition, the container 9 may be transparent with internal visibility or opaque. Here, "transparent" is a concept including translucency, as long as it has visibility to the extent that an outline of the absorbent composite 10A inside the container 9, or a portion to which the ink Q of the absorbent composite 10A is attached can be identified.

As described above, the ink absorber 100 is provided with the lid 8 sealing the container 9. As illustrated in FIG. 11, the lid 8 has a plate-like shape and can be fitted to an upper opening portion 94 of the container 9. By this fitting, the upper opening portion 94 can be sealed in a liquid tight manner. As a result, for example, when the ink Q is discharged from the tube 203 and dropped, even when the ink Q collides with absorbent composite 10A and jumps up, the ink Q can be prevented from scattering outward. Therefore, the ink Q can be prevented from adhering to the periphery of the ink absorber 100 and being soiled.

A coupling port 81 to which the tube 203 is coupled is formed at a central portion of the lid 8. The coupling port 81 is configured to include a through-hole which penetrates the lid 8 in the thickness direction. The downstream end portion of the tube 203 can be inserted into and coupled to the coupling port 81. In addition, at this time, a discharge port 203a of the tube 203 faces downward.

For example, radial ribs or grooves may be formed around the coupling port 81 on the lower surface of the lid 8. The rib or the groove can function as, for example, a regulation portion that regulates the flow direction of the ink Q in the container 9.

In addition, the lid 8 may have an absorbency to absorb the ink Q, or may have a lyophobic property to repel the ink Q.

The thickness of the lid 8 is not particularly limited, and is preferably, for example, 1 mm or more and 20 mm or less, and more preferably 8 mm or more and 10 mm or less. The lid 8 is not limited to a plate-like one having such a numerical range, and may be a film-like one thinner than the plate-like one. In this case, the thickness of the lid 8 is not particularly limited, and is preferably, for example, 10 μm or more and less than 1 mm.

The number of pieces of the small pieces 1 stored in the container 9 is not particularly limited, and the necessary number may be appropriately selected according to various conditions such as the use of the ink absorber 100, for example. As described above, the ink absorber 100 has a simple configuration in which the required number of small pieces 1 is stored in the container 9. The maximum absorption amount of the ink Q in the ink absorber 100 is adjusted according to the size of the storage amount of the small pieces 1.

Hereinbefore, although the preferred embodiments of the present disclosure are described, the present disclosure is not limited to the above embodiments.

For example, in the embodiments described above, although the case where the small pieces constituting the absorbent composite carry on the water absorbent resin on the surface of the fiber base material is described, the small pieces constituting the absorbent composite may be any one containing the fibers and the water absorbent resin, and may uniformly contain the fibers and the water absorbent resin in each portion.

In addition, in the embodiments described above, at the time of manufacturing the absorbent composite, although the configuration of enhancing the adhesion between the fiber and the water absorbent resin is representatively described by going through a process of bringing the water absorbent resin into contact with a liquid containing water to soften the water absorbent resin, an adhesive may be used to bond the fiber and the water absorbent resin.

In addition, in the second embodiment described above, the case where the pinching step is performed by bending the sheet-like fiber base material 2 to which the water absorbent resin is applied in half is described, and for example, the pinching step may be performed by preparing two sheet-like fiber base materials to which the water absorbent resin is applied, and causing these fiber base materials to face on the surface on which carries the water absorbent resin.

In addition, the absorbent composite according to the present disclosure is not limited to one manufactured by the method as described above.

EXAMPLE

Next, specific examples of the present disclosure will be described.

In the following description, a treatment which does not indicate the temperature condition and the humidity condition is performed under the environment of a temperature of 25° C. and a relative humidity of 35%. In addition, various measurements are performed at a temperature of 25° C. and a relative humidity of 35% when the temperature condition and the humidity condition are not indicated.

[1] Preparation of Absorbent Composite

Example 1

First, G80A4W manufactured by Toppan Forms Co., Ltd., which is a waste paper of length 30 cm, width 22 cm, thickness 0.5 mm, was prepared as a sheet-like fiber base material. In addition, the weight of the paper was 4 g/one sheet.

Next, 2 g of pure water was applied to the entire surface of the waste paper from one surface side by spraying.

Next, SUNFRESH 500 MPSA (manufactured by Sanyo Chemical Industries, Ltd.) as a polyacrylic acid polymer crosslinked product, which is a water absorbent resin having a carboxyl group as an acid group in a side chain, was applied from the surface side applied with pure water of the waste paper. At this time, the water absorbent resin was applied while passing through a sieve (JTS-200-45-106 manufactured by Tokyo Screen Co., Ltd.) having a mesh having an opening size of 0.106 mm. The application amount of the water absorbent resin per one waste paper was 3 g.

The waste paper was folded in half so that a valley was formed on the surface to which the water absorbent resin adhered. In this folded state, the sheet-like fiber base material was pressurized and heated in the thickness direction using a pair of heating blocks as shown in FIG. 6. The pressurizing was performed at 0.15 kg/cm$^2$, and the heating temperature was 100° C. In addition, the heating and pressurizing time was 120 seconds.

The heating and pressurizing were released, the fiber base material left at room temperature for 12 hours. When the sheet-like fiber base material was at room temperature, the sheet-like fiber base material was cut into a strip having a width of 2 mm and a length of 15 mm using a shredder with a basic shred size of 2 mm×15 mm (SeCuret series F3143SP manufactured by Ishizawa Seisakusho Co., Ltd.,) to obtain a plurality of small pieces of aggregate.

The content of the water absorbent resin in the small pieces was 75% by mass with respect to the fibers, and the average particle diameter of the water absorbent resin was 35 to 50 μm. In addition, in each of the small pieces, the water absorbent resin was impregnated into the fiber base material.

By cutting into small pieces with the multi-cut shredder in this manner, an absorbent composite deformed into an indeterminate shape due to a difference in shear force at the time of cutting or stress strain in the material piece was prepared.

Example 2

An absorbent composite was prepared in the same manner as in Example 1 except that a sheet-like fiber base material carried on by a water absorbent resin, and heated and pressurized in a bent state was cut using a shredder (SeCuret series F3143SP manufactured by Ishizawa Seisakusho Co., Ltd.), a small piece obtained by the cutting was subjected to a cutting treatment using the shredder one more time, and thereafter, the small pieces were deformed by vibration as described above.

Example 3

An absorbent composite was prepared in the same manner as in Example 1 except that a sheet-like fiber base material carried on by a water absorbent resin, and heated and pressurized in a bent state was cut using a shredder (SeCuret series F3143SP manufactured by Ishizawa Seisakusho Co., Ltd.), a small piece obtained by the cutting was subjected to a cutting treatment using the shredder three more time, and thereafter, the small pieces were deformed by vibration as described above.

Example 4

An absorbent composite was prepared in the same manner as in Example 1 except that a sheet-like fiber base material carried on by a water absorbent resin, and heated and pressurized in a bent state was cut using a shredder (SeCuret series F3143SP manufactured by Ishizawa Seisakusho Co., Ltd.), a small piece obtained by the cutting was subjected to a cutting treatment using the shredder five more time, and thereafter, the small pieces were deformed by vibration as described above.

Example 5

An absorbent composite was prepared in the same manner as in Example 1 except that the fiber base material was cut into a rectangle of width 2 mm×length 15 mm with a scissors without using the shredder, when obtaining small pieces, and each of the small pieces was manually bent a portion of 1 mm from one end portion in the longitudinal direction to 90°, instead of deforming the small pieces by vibration.

Example 6

An absorbent composite was prepared in the same manner as in Example 5 except that the bending portion for each of the small pieces was changed to a portion of 5 mm from one end portion in the longitudinal direction.

Example 7

An absorbent composite was prepared in the same manner as in Example 5 except that the bending portion for each of the small pieces was changed to a portion of 7.5 mm from one end portion in the longitudinal direction, that is, a central portion in the longitudinal direction.

Example 8

An absorbent composite was prepared in the same manner as in Example 1 except that the fiber base material was cut into a square of 10 mm square with a scissors without using the shredder, when obtaining small pieces, and each of the small pieces was bent at 90° with the diagonal of the square, instead of deforming the small pieces by vibration.

Example 9

An absorbent composite was prepared by mixing the absorbent composite of Example 7 and the absorbent composite of Example 8 at a mass ratio of 50:50.

Comparative Example 1

First, G80A4W, manufactured by Toppan Foams Co., Ltd., which is the waste paper, was prepared and subjected to a defibration treatment to obtain a cotton-like defibrated material. The defibration treatment was performed using a high speed mill (HBGL manufactured by UNIWORLD Co. Ltd.).

Next, 20 parts by mass of SUNFRESH 500 MPSA (manufactured by Sanyo Chemical Industries, Ltd.) as a polyacrylic acid polymer crosslinked product, which is a water absorbent resin having a carboxyl group as an acid group in a side chain, was applied. At this time, the water absorbent resin was applied while passing through a sieve (JTS-200-45-106 manufactured by Tokyo Screen Co., Ltd.) having a mesh having an opening size of 0.106 mm.

Thereafter, the mixture was put into a plastic bag, and vibration was applied with an amplitude of 100 mm and a frequency of 3 Hz for 30 seconds to prepare an absorbent composite by mixing. That is, the absorbent composite of present Comparative Example does not contain the small pieces.

Comparative Example 2

An absorbent composite was prepared in the same manner as in Example 1 except that the sheet-like fiber base material as it is was cut into a strip having a width of 2 mm and a length of 15 mm by using a shredder with a basic shred size of 2 mm×15 mm (SeCuret series F3143SP manufactured by Ishizawa Seisakusho Co., Ltd.), without applying pure water and a water absorbent resin, bending, heating, or pressurizing.

Comparative Example 3

An absorbent composite was prepared in the same manner as in Example 5 except that the treatment of bending the small pieces obtained by the scissors was omitted.

Figure 12:
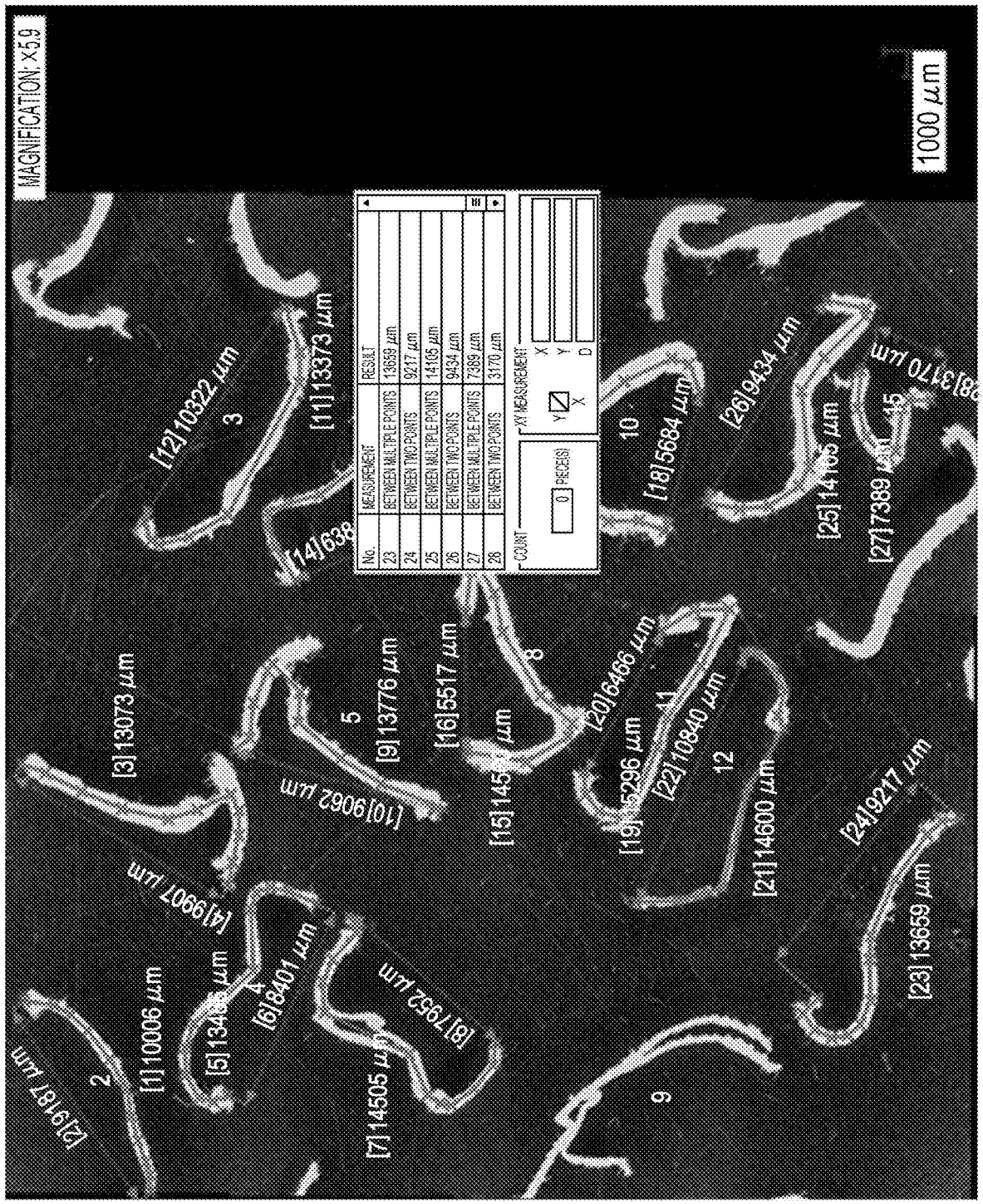
FIG. 12 is a photograph of a small piece contained in an absorbent composite of Example 1.
Figure 13:
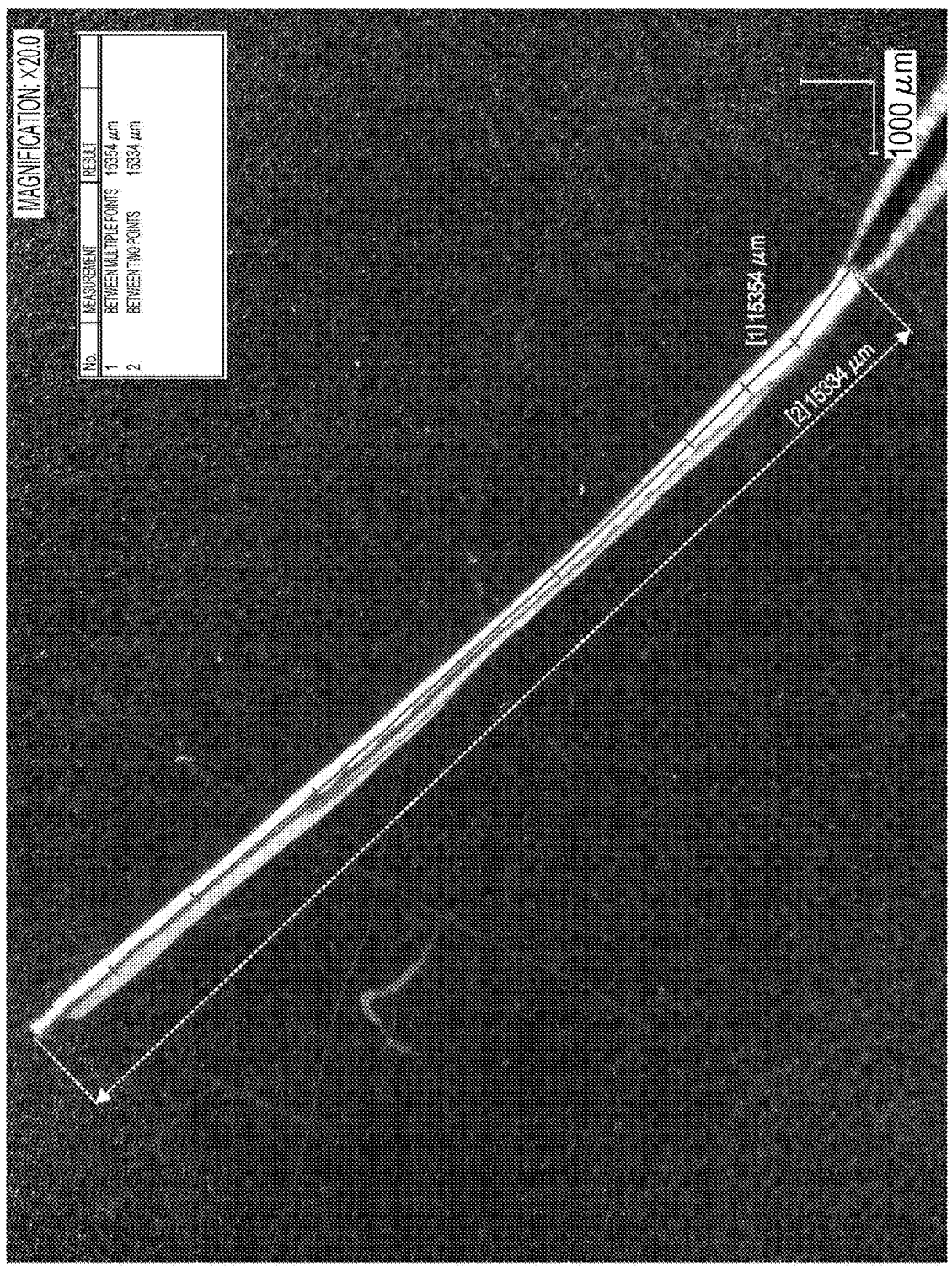
FIG. 13 is a photograph of a small piece contained in an absorbent composite of Comparative Example 3.

The configuration and the like of the absorbent composites of each of Examples and Comparative Examples are collectively shown in Table 1. The observation of the shape of the small pieces was performed by taking 16 small pieces as samples for each of Examples and Comparative Examples, and using a digital microscope (VHX-5000 manufactured by Keyence Corporation) for these small pieces. In addition, in Table 1, as a value of bulk density, a value obtained by measurement as follows is shown. That is, first, a plurality of Terumo plastic syringes (standard SS-50 ESZ) are prepared, and an operation of applying horizontal vibration with an amplitude of 30 mm and a frequency of 3 Hz for 5 seconds was repeated 10 times every time one tenth of each sample of the absorbent composite: 3 g was added to the plastic syringes different from one another. The volume at that time was determined, and the bulk density was determined from the volume and mass. For the absorbent composites of each of Examples and Comparative Examples, three plastic syringes were respectively used to determine the bulk density, and the average value thereof was adopted as the value of bulk density. In addition, a photograph of the small pieces contained in the absorbent composite of Example 1 is shown in FIG. 12, and a photograph of the small pieces contained in the absorbent composite of Comparative Example 3 is shown in FIG. 13. The photograph shown in FIG. 13 shows a state where one end portion of one side is pinched with tweezers and measured in order to measure from the side surface.

For each of the three plastic syringes of each of Examples and Comparative Examples, a mesh was opened after 1 minute, 10 minutes, and 30 minutes after completion of the dropping of the ink, the amount of unabsorbed ink at each time was measured, and the amount of absorbed ink was determined from the result to evaluate according to the following criteria. It can be said that the larger the ink absorption amount, the better the absorption characteristics of the liquid.

In Comparative Example 3 in which the defibrated material was used, the defibrated material was pressurized to a volume of 25 cc in the plastic syringe before dropping the ink, and evaluation was performed in such a compressed state.

S: Total absorption of 50 cc.

A: Ink absorption amount is 40 cc or more and less than 50 cc.

B: Ink absorption amount is 30 cc or more and less than 40 cc.

C: Ink absorption amount is 20 cc or more and less than 30 cc.

D: Ink absorption amount is 10 cc or more and less than 20 cc.

E: Ink absorption amount is less than 10 cc.

The results are shown in Table 2. When the ink overflowed from the plastic syringe in the middle of the dropping of the ink, the dropping of the ink was stopped at that time, and it was indicated as "-" in Table 2.

TABLE 1

| | | | Small pieces | | | | | | |
|---|---|---|---|---|---|---|---|---|---|
| | Type of fibers | Whether water absorbent resin is carried on | Average L1 [mm] | Average L2 [mm] | Average width [mm] | Average thickness [μm] | Aspect ratio (length/width) | Average L2/L1 | Bulk density [g/cm$^3$] |
| Example 1 | Constituting Small pieces | Present | 13.34 | 8.65 | 2.11 | 300 | 6.39 | 0.652 | 0.12 |
| Example 2 | Constituting Small pieces | Present | 3.36 | 2.85 | 1.87 | 303 | 1.80 | 0.850 | 0.20 |
| Example 3 | Constituting Small pieces | Present | 3.04 | 2.69 | 1.74 | 299 | 1.75 | 0.885 | 0.23 |
| Example 4 | Constituting Small pieces | Present | 2.81 | 2.61 | 1.503 | 286 | 1.87 | 0.930 | 0.25 |
| Example 5 | Constituting Small pieces | Present | 14.91 | 13.25 | 2.19 | 308 | 6.86 | 0.889 | 0.17 |
| Example 6 | Constituting Small pieces | Present | 14.75 | 11.26 | 2.26 | 310 | 6.54 | 0.764 | 0.17 |
| Example 7 | Constituting Small pieces | Present | 14.64 | 2.83 | 2.18 | 297 | 6.74 | 0.193 | 0.20 |
| Example 8 | Constituting Small pieces | Present | 13.83 | 9.80 | 9.73 | 277 | 1.02 | 0.710 | 0.11 |
| Example 9 | Constituting Small pieces | Present | 14.24 | 6.32 | 5.96 | 287 | 3.88 | 0.451 | 0.15 |
| Comparative Example 1 | Defibrated material | Present | — | — | — | — | — | — | 0.12 |
| Comparative Example 2 | Constituting Small pieces | Absent | 14.96 | 14.83 | 2.10 | 102 | 7.12 | 0.994 | 0.3 |
| Comparative Example 3 | Constituting Small pieces | Present | 14.91 | 14.82 | 2.19 | 297 | 6.87 | 0.995 | 0.25 |

[2] Evaluation

First, for each of Examples and Comparative Examples, each of the plastic syringes containing three absorbent composites used for the measurement of the bulk density were prepared.

Next, at the center position of the plastic syringe containing the absorbent composite, 50 cc of mixed ink in which BK (RDH-BK), C (RDH-C), M (RDH-M), and Y (RDH-Y) manufactured by Seiko Epson Corporation, which are commercially available ink jet inks, were mixed at a mass ratio of 3:1:1:1 was dropped in 3 seconds.

TABLE 2

| | Evaluation | | |
|---|---|---|---|
| | After 1 minute | After 10 minutes | After 30 minutes |
| Example 1 | D | B | A |
| Example 2 | C | A | S |
| Example 3 | B | S | S |

TABLE 2-continued

| | Evaluation | | |
|---|---|---|---|
| | After 1 minute | After 10 minutes | After 30 minutes |
| Example 4 | C | A | S |
| Example 5 | E | D | B |
| Example 6 | E | D | C |
| Example 7 | E | D | C |
| Example 8 | E | D | C |
| Example 9 | E | D | C |
| Comparative Example 1 | — | — | — |
| Comparative Example 2 | E | D | D |
| Comparative Example 3 | E | D | C |

As apparent from Table 2, in the present disclosure, excellent absorption characteristics were confirmed. On the other hand, in Comparative Examples, satisfactory results were not obtained.

In addition, when the same evaluation as described above was performed except that BCI-381sBK, an ink jet ink manufactured by Canon Inc., LC3111BK, an ink jet ink manufactured by Brother Industries, Ltd., and HP 61XL CH563WA, an ink jet ink manufactured by Hewlett-Packard Co. were used instead of the mixed ink of ink jet ink manufactured by SEIKO EPSON CORPORATION used above, the same result as described above was obtained.

In addition, when the same evaluation as described above was performed except that the volume and shape of the container, and ink application amount were variously changed, the same results as described above were obtained.

In addition, when the absorbent composite was produced in the same manner as in the above Examples, and the same evaluation as described above was performed except that the content of the water absorbent resin in the small pieces was changed in the range of 25% by mass or more and 300% by mass or less with respect to the fibers, the same results as described above were obtained.

What is claimed is:

1. An absorbent system comprising:
    an absorbent composite comprising:
        an aggregate of small pieces having a shape with a longitudinal direction, including fibers and a water absorbent resin; and
    a container storing the absorbent composite and ink, wherein
    when a total length in the longitudinal direction of the small piece is L1 [mm] and a distance between end points connecting one end and the other end of the small piece is L2 [mm], an average value of L2/L1 is greater than 0 and 0.950 or less, and
    the absorbent composite is configured to absorb waste liquid from the ink disposed in the container.

2. The absorbent system according to claim 1, wherein the small piece has a fiber base material containing the fibers, and
    the water absorbent resin is carried on at least one surface of the fiber base material.

3. The absorbent system according to claim 2, wherein the small piece has a plurality of stacked fiber base materials, and
    the water absorbent resin is provided between the fiber base materials.

4. The absorbent system according to claim 1, wherein an average value of the L1 is 1.0 mm or more and 50 mm or less.

5. The absorbent system according to claim 1, wherein the small piece has a twisted shape.

6. The absorbent system according to claim 1, wherein the small piece is provided with a half cut or a cutout.

* * * * *